(12) United States Patent
Wang et al.

(10) Patent No.: US 11,740,686 B2
(45) Date of Patent: Aug. 29, 2023

(54) PLATFORM AND PROCESSOR POWER MANAGEMENT

(71) Applicant: Tahoe Research, Ltd., Dublin (IE)

(72) Inventors: Ren Wang, Portland, OR (US); Christian Maciocco, Portland, OR (US); Sanjay Bakshi, Beaverton, OR (US); Tsung-Yuan Charles Tai, Portland, OR (US)

(73) Assignee: Tahoe Research, Ltd., Dublin (IE)

( * ) Notice: Subject to any disclaimer, the term of this patent is extended or adjusted under 35 U.S.C. 154(b) by 0 days.

(21) Appl. No.: 17/234,681

(22) Filed: Apr. 19, 2021

(65) Prior Publication Data
US 2021/0240252 A1    Aug. 5, 2021

Related U.S. Application Data

(63) Continuation of application No. 15/195,485, filed on Jun. 28, 2016, now Pat. No. 10,983,585, which is a continuation of application No. 14/521,170, filed on Oct. 22, 2014, now Pat. No. 9,383,798, which is a continuation of application No. 13/947,479, filed on Jul. 22, 2013, now Pat. No. 8,898,499, which is a continuation of application No. 12/317,967, filed on Dec. 31, 2008, now Pat. No. 8,495,403.

(51) Int. Cl.
| | |
|---|---|
| *G06F 1/3287* | (2019.01) |
| *G06F 1/329* | (2019.01) |
| *G06F 1/3203* | (2019.01) |
| *G06F 9/4401* | (2018.01) |
| *G06F 1/3209* | (2019.01) |
| *G06F 1/3215* | (2019.01) |

(52) U.S. Cl.
CPC .......... *G06F 1/3287* (2013.01); *G06F 1/3203* (2013.01); *G06F 1/329* (2013.01); *G06F 9/4418* (2013.01); *G06F 1/3209* (2013.01); *G06F 1/3215* (2013.01); *Y02D 10/00* (2018.01); *Y02D 30/50* (2020.08)

(58) Field of Classification Search
CPC ...... G06F 1/3287; G06F 1/3203; G06F 1/329; G06F 9/4418; G06F 1/3209; G06F 1/3215; Y02D 10/00; Y02D 30/50; Y02D 50/20; Y02D 10/24
USPC ........................................ 713/300, 320, 323
See application file for complete search history.

(56) References Cited

U.S. PATENT DOCUMENTS

| | | | |
|---|---|---|---|
| 5,220,653 A | 6/1993 | Miro | |
| 5,574,920 A * | 11/1996 | Parry | .................... G06F 3/0601 713/340 |
| 5,682,273 A | 10/1997 | Hetzler | |

(Continued)

FOREIGN PATENT DOCUMENTS

| | | |
|---|---|---|
| JP | 2002099433 | 4/2002 |
| JP | 2003099162 | 4/2003 |

(Continued)

OTHER PUBLICATIONS

Advisory Action dated Feb. 12, 2020 for U.S. Appl. No. 15/195,485.

(Continued)

*Primary Examiner* — Ji H Bae
(74) *Attorney, Agent, or Firm* — Studebaker & Brackett PC

(57) ABSTRACT

The present invention relates to platform power management.

22 Claims, 3 Drawing Sheets

(56) References Cited

U.S. PATENT DOCUMENTS

| | | | |
|---|---|---|---|
| 5,708,814 | A | 1/1998 | Short |
| 5,708,816 | A * | 1/1998 | Culbert .................. G06F 1/3203 710/200 |
| 5,905,913 | A | 5/1999 | Garrett |
| 5,943,479 | A | 8/1999 | Klein |
| 6,018,232 | A * | 1/2000 | Nelson .................. G06F 1/3209 320/127 |
| 6,085,277 | A | 7/2000 | Nordstrom et al. |
| 6,192,440 | B1 | 2/2001 | Lowe |
| 6,195,725 | B1 | 2/2001 | Luhmann |
| 6,266,776 | B1 | 7/2001 | Sakai |
| 6,308,223 | B1 | 10/2001 | Opgenoorth |
| 6,574,694 | B1 | 6/2003 | Chen |
| 6,615,305 | B1 | 9/2003 | Olesen |
| 6,718,413 | B1 | 4/2004 | Wilson |
| 6,760,799 | B1 | 7/2004 | Dunlap |
| 6,879,580 | B1 | 4/2005 | Djuphammar et al. |
| 7,124,293 | B2 | 10/2006 | Mualem |
| 7,159,030 | B1 | 1/2007 | Elzur |
| 7,424,632 | B2 | 9/2008 | Powers et al. |
| 7,725,750 | B2 | 5/2010 | Ashish |
| 7,774,631 | B1 | 8/2010 | Walton |
| 7,802,259 | B2 | 9/2010 | Myers et al. |
| 8,023,522 | B2 | 9/2011 | Gobriel et al. |
| 8,112,651 | B2 * | 2/2012 | Wang .................. G06F 1/3209 713/323 |
| 10,983,585 | B2 * | 4/2021 | Wang .................. G06F 9/4418 |
| 2003/0105983 | A1 * | 6/2003 | Brakmo ................ G06F 1/3262 713/320 |
| 2003/0110281 | A1 | 6/2003 | Minnick |
| 2003/0131271 | A1 | 7/2003 | Chen |
| 2003/0210658 | A1 * | 11/2003 | Hernandez ........ H04W 52/0232 370/252 |
| 2004/0194087 | A1 * | 9/2004 | Brock .................. G06F 9/505 718/100 |
| 2004/0198302 | A1 | 10/2004 | Hutchison |
| 2005/0228922 | A1 | 10/2005 | Tsao |
| 2006/0104303 | A1 | 5/2006 | Makineni |
| 2006/0161460 | A1 * | 7/2006 | Smitherman .......... G16H 15/00 705/3 |
| 2006/0294407 | A1 | 12/2006 | Rothman et al. |
| 2007/0033438 | A1 | 2/2007 | Hsieh |
| 2007/0043347 | A1 | 2/2007 | Solmita et al. |
| 2007/0116049 | A1 * | 5/2007 | Johnson ................ G06F 1/3203 370/468 |
| 2008/0077724 | A1 | 3/2008 | Sarangam |
| 2008/0189538 | A1 * | 8/2008 | King ...................... G06F 9/441 713/1 |
| 2008/0242269 | A1 | 10/2008 | Lee |
| 2009/0031156 | A1 * | 1/2009 | Barth .................... G06F 1/3203 713/323 |
| 2009/0077394 | A1 | 3/2009 | Tsai |
| 2009/0077396 | A1 | 3/2009 | Tsai |
| 2009/0164817 | A1 * | 6/2009 | Axford .................. G06F 1/3203 713/322 |
| 2010/0039971 | A1 | 2/2010 | Lor et al. |
| 2010/0246591 | A1 | 9/2010 | Gobriel et al. |

FOREIGN PATENT DOCUMENTS

| | | |
|---|---|---|
| JP | 2003220742 | 8/2003 |
| JP | 2004320153 | 11/2004 |
| JP | 2005346301 | 12/2005 |
| JP | 2006041971 | 2/2006 |
| JP | 2006072991 | 3/2006 |
| JP | 2006522384 | 9/2006 |
| JP | 2007086917 | 4/2007 |
| TW | 594466 | 6/2004 |
| TW | 200707232 | 2/2007 |

OTHER PUBLICATIONS

Advisory Action dated Mar. 11, 2019 for U.S. Appl. No. 15/195,485.
Final Office Action dated Dec. 10, 2018 for U.S. Appl. No. 15/195,485.
Final Office Action dated Apr. 25, 2014 for U.S. Appl. No. 13/947,479.
Final Office Action dated Feb. 3, 2017 for U.S. Appl. No. 12/317,967.
Final Office Action dated Nov. 29, 2019 for U.S. Appl. No. 15/195,485.
Final Office Action dated Sep. 9, 2020 for U.S. Appl. No. 15/195,485.
First Office Action dated Aug. 2, 2011 for Chinese Patent Application No. 200911000257.2.
Fourth Office Action dated Jun. 24, 2013 for Chinese Patent Application No. 200911000257.2.
Non-Final Office Action dated Mar. 18, 2020 for U.S. Appl. No. 15/195,485.
Non-Final Office Action dated Jun. 12, 2019 for U.S. Appl. No. 15/195,485.
Non-Final Office Action dated Apr. 29, 2015 for U.S. Appl. No. 14/521,170.
Non-Final Office Action dated Jun. 6, 2018 for U.S. Appl. No. 15/195,485.
Non-Final Office Action dated May 23, 2011 for U.S. Appl. No. 12/317,967.
Non-Final Office Action dated Nov. 8, 2013 for U.S. Appl. No. 13/947,479.
Non-Final Office Action dated Oct. 8, 2015 for U.S. Appl. No. 14/521,170.
Notice of Allowance dated Aug. 21, 2012 for Japanese Patent Application No. 2009-293552—no translation available.
Notice of Allowance dated Dec. 16, 2020 for U.S. Appl. No. 15/195,485.
Notice of Allowance dated Feb. 11, 2013 for U.S. Appl. No. 12/317,967.
Notice of Allowance dated Feb. 25, 2014 for Taiwan Patent Application No. 098144815—no translation available.
Notice of Allowance dated Jul. 22, 2014 for U.S. Appl. No. 13/947,479.
Notice of Allowance dated Mar. 2, 2016 for U.S. Appl. No. 14/521,170.
Notice of Allowance dated Mar. 20, 2014 for Chinese Patent Application No. 200911000257.2.
Office Action & Search Report dated Jun. 3, 2016 for Taiwan Patent Application No. 098144815.
Office Action dated Oct. 4, 2011 for Japanese Patent Application No. 2009-293552.
Second Office Action dated May 9, 2012 for Chinese Patent Application No. 200911000257.2.
Third Office Action dated Nov. 28, 2012 for Chinese Patent Application No. 200911000257.2.

* cited by examiner

PLATFORM AND PROCESSOR POWER MANAGEMENT

CROSS-REFERENCE TO RELATED APPLICATIONS

This application is a continuation of, and claims the benefit of priority to, U.S. patent application Ser. No. 15/195,485, filed Jun. 28, 2016, which is a continuation of, and claims the benefits of priority to U.S. patent application Ser. No. 14/521,170, filed Oct. 22, 2014, now issued as U.S. Pat. No. 9,383,798 on Jul. 5, 2016, which is a continuation of and claims the benefit of priority to U.S. patent application Ser. No. 13/947,479, filed Jul. 22, 2013, now issued as U.S. Pat. No. 8,898,499 on Nov. 25, 2014, which is a continuation of and claims the benefit of priority to U.S. patent application Ser. No. 12/317,967, filed on Dec. 31, 2008, now issued as U.S. Pat. No. 8,495,403 on Jul. 23, 2013, and which is incorporated by reference in entirety.

TECHNICAL FIELD

The present invention relates generally to computing systems and in particular to platform management methods and systems.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Mobile platform computing devices, e.g. laptops, tablets, cell phones, and mobile internet devices (MIDs), offer ubiquitous network connectivity through one or more communication interfaces. Most of these platforms' usage models are driven by communication activities. While communication devices themselves consume a relatively small portion of the platform power, the impact of communication usages on the overall platform power can be significant due to the non-deterministic nature of the incoming/outgoing network traffic, which may keep the platform active in higher power consuming states more than necessary.

Network task activities are typically initiated by applications usually based on timer expirations to wake up the host in order to generate outgoing messages. In the past, if the platform components were in a deep sleep state, e.g., lowest C state (i.e., C5 or higher) for the processor and similar lower level platform power state, then this activity to send non-time-critical packets would cost significant amounts of power as they would prevent the full platform to reach or remain in lower power states. To make matters worse, the applications generally operate independently based on their own timers, without knowledge of the platform or other application operations. As a result, the platform would wake up at random times to process tasks issued from the different applications, preventing the platform from reaching and staying in the low power states.

In some embodiments disclosed herein, interfaces and mechanisms are presented for applications that require network keep-alive, periodic and non-time-critical network access to sync-up with the platform activities and with each other in order to create longer periods of idleness for the platform. For example, to maintain the application's "heart beat" while waking-up the platform for a minimum number of times, non-time-critical outgoing network activities may be synchronized, as allowed within the limit of the most stringent timing requirements.

As platforms move to the use of so-called "tickless" operating systems (OS), it becomes desirable to control outgoing network traffic activities and coordinate them with platform activity to fully benefit from longer term idleness, which may allow platform components to reach deeper sleep states, thus increasing battery life.

Figure 1:
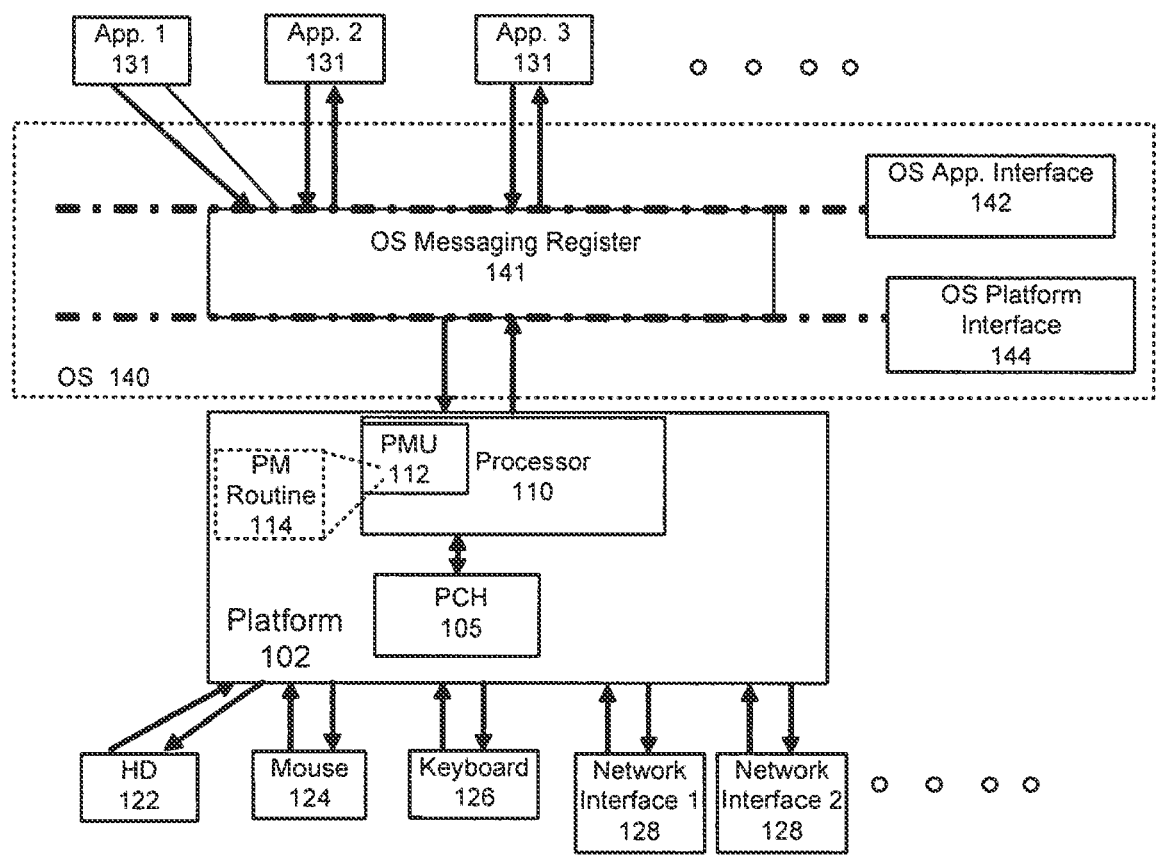
FIG. 1 is a diagram of a computing system in accordance with some embodiments.

FIG. 1 shows a computing system in accordance with some embodiments. This diagram illustrates an architecture for implementing platform power management. The system comprises a platform 102 with peripheral devices including a hard drive 122, mouse 124, keyboard 126, and network interface devices 128. The platform 102 includes at least one processor 110 and platform control hub 105, coupled as shown. Also included is a power management unit (PMU) 112, which in this embodiment, is part of the processor 110. (A power management unit may be implemented as a separate processing unit in a separate chip or in any suitable chip in the platform. In some embodiments, it may be implemented as a separate controller within the processor or in another chip such as the PCH 105.) The processor and/or PMU execute an operating system (OS) 140, along with applications 131. In the depicted embodiment, the OS (e.g., in user space driver, patch, or equivalent) implements an OS application interface 142 and OS platform interface 144 for identifying tasks to be performed on the application and platform sides, respectively. An OS messaging register 141 is set up to store task information (e.g., task queues, timers, etc.) for efficient performance coordination.

The applications 131 represent applications such as instant messaging (IM), internet widget, email, and other applications that have network activity (periodic or otherwise) without necessarily having user involvement. These applications typically send out keep-alive messages periodically to prevent connectivity from timing-out, and pull updated information e.g. email in box status, weather report, stock changes etc. for widgets and the like.

The PMU 112 may perform various different functions including managing the platform, as well as managing its activity state. In some embodiments, the platform activity state is independent from the activity state of the processor. For example, the processor may be in a so-called "C" state (as defined by the Advanced Configuration Power Interface, ACPI, standard) whereby C0 is the most active state, while lower activity states (e.g., C1 to C7) define different levels of reduced activity and thus reduced power consumption. At the same time, the platform may be in its own power state, e.g., ranging from a higher activity state to lower level sleep states. In some schemes, S0 is the highest activity platform state, while S3, S4, and S5 indicate progressively lower activity platform states. In some embodiments, when the platform is in an S0 state, network communications and other platform activity may occur, even when the processor is asleep, i.e., in a lower C state.

The OS application interface 142 enables the applications to register with the OS service to synchronize the outgoing network requests (i.e. transmissions). This OS level feature enables the pull-in of tasks that would be expected to be run within the next period of quietness in order to run them sooner, assuming their jitter" requirements are within bound. This works to make the platform quieter to enable longer idleness.

The OS platform interface 144 is an interface between the platform and the OS. Through this interface, the platform informs the OS of expected period(s) of quietness. For example, the network interface (communication) device 128 informs the OS platform interface via the PCH 105 of expected idle durations and holds incoming traffic on the communication device. The duration may be estimated through heuristics or other means. Similarly, the other peripheral devices may instruct the interface, via the PCH, about their quietness duration, and then the PCH can notify the OS through this interface.

In some embodiments, applications having non-critical outgoing messages deadlines or engaging in periodic network activity register with the OS-application interface for coordinating application task and platform activities. The provided information may include, for example, message frequency and timing requirements including allowable jitter.

Figure 2:
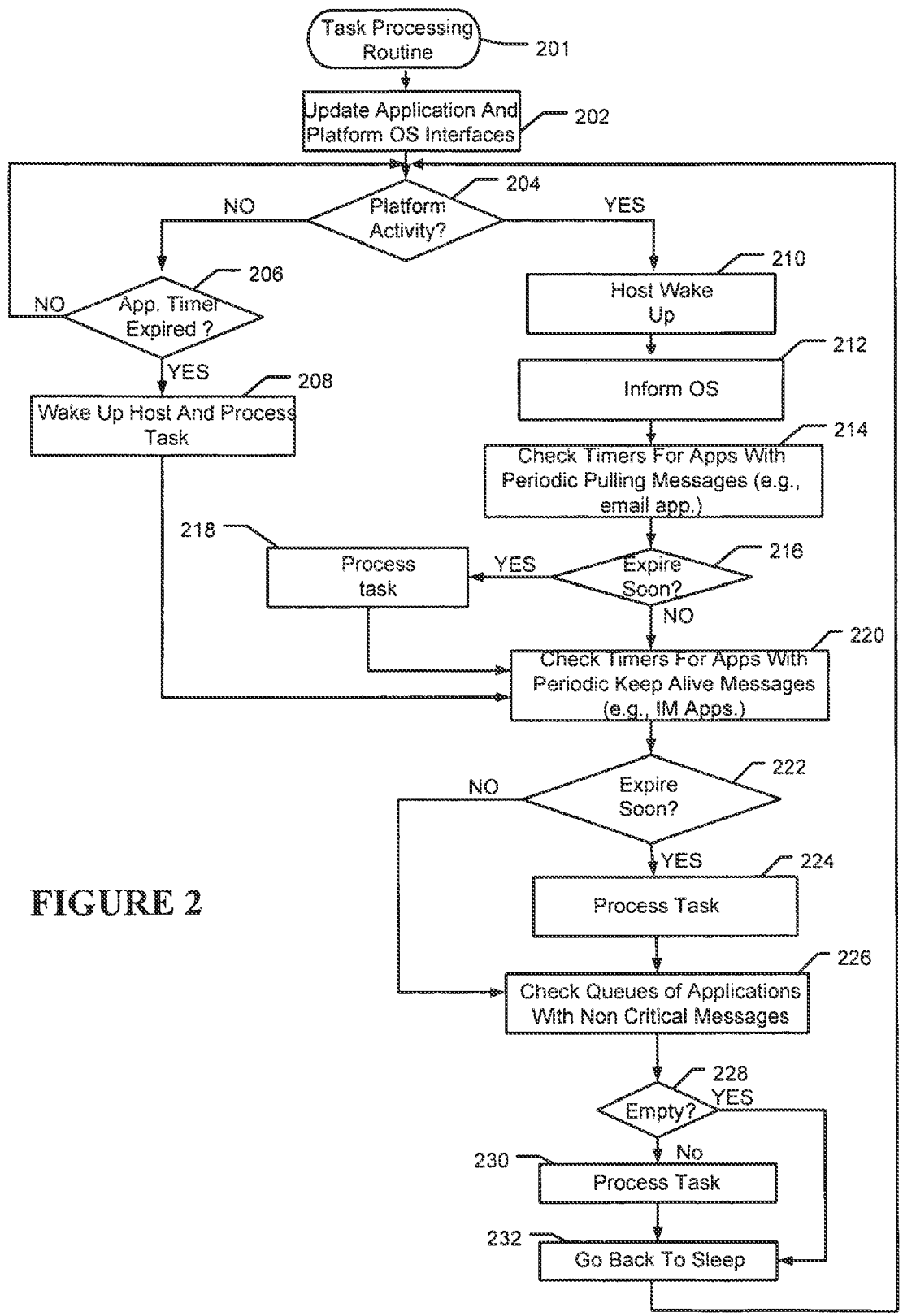
FIG. 2 is a flow diagram of a routine for synchronizing tasks for a host when it is to be awoken in accordance with some embodiments.
Figure 3:
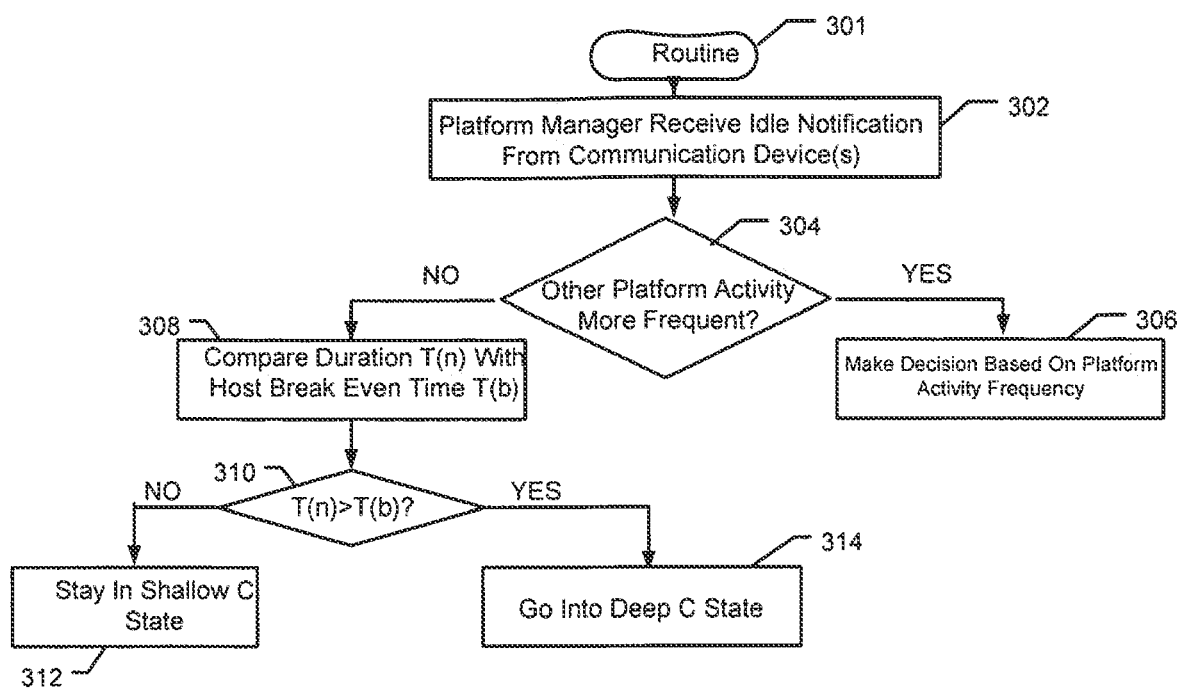
FIG. 3 is a flow diagram of a routine for initiating a host mode based on a received network device idle notification in accordance with some embodiments.

In the depicted embodiment, the PMU 112 executes a platform management routine 114, which among other things, coordinates the processing of application and/or platform tasks that must be performed, even when the processor is at a lower activity state. FIGS. 2 and 3 (discussed below) show different routine functions that may be performed as part of a platform management scheme. In some embodiments, they may be executed as part of a platform management routine 114 in a PMU 112.

FIG. 2 shows a routine 201, which may be run or initiated by a platform management program such as PM program 114, for coordinating task application and platform task processing when a processor is in a sleep mode. Initially, at 202, the OS application and OS platform interfaces (or equivalents) are initialized or updated with application timer and platform idle duration (e.g., estimated idleness) information. Regarding platform information, the platform may predict the incoming period of idleness based on various factors. For example, predicted idleness could be based on information from peripheral devices. Incoming idle durations can be detected by the PCH and/or PMU when the peripheral devices indicate that there won't be activity for some time, e.g. the communication device buffering the data for the next 50-100 ms. Idle durations may also be predicted using adaptive estimation approaches, e.g., based on heuristic idle durations. For example, an exponential filter could be applied to estimate the incoming idleness based on past history of idleness duration.

Next, at 204, the routine determines if there is platform activity. For example, if a user is attempting to interface with the platform through one or more of the peripheral devices, this would be caught here. If the platform is not active, then the routine proceeds to 206 to determine if any application timers have expired. If none have expired, indicating that application tasks are not needing to be serviced, then the routine loops back to 204. Otherwise, if one or more application timers has gone off, then the routine proceeds to 208 where it wakes up the host to process the task corresponding to the expired timer. From here, it goes to 220 and checks other applications and/or application timers, e.g., applications with keep alive messages needing to be periodically communicated.

At 222, it checks to see if any of these application timers will expire soon, e.g., within a predicted platform idleness duration. If so, then at 224, it processes the task(s) and goes to 226 to check application queue(s) for applications with non time critical tasks to be serviced. At 222, if the keep alive application timers were not to go off soon, then the routine would come to 226 directly.

At 228, it checks to see if the non-critical application queue is empty or has tasks to be processed. If there are tasks, they are processed (or serviced) at 230 thereby extending the idleness period even further. The routine then goes to 232 and initiates the host to go back to sleep, and loops back to 204. If the queue is empty at 228, then it goes right to 232 and proceeds as described.

Returning back to 204, if there is platform activity, then the routine proceeds to 210 and wakes up the host (processor). From here, it goes to 212 and informs the OS and then goes to 214 and checks timers for applications with periodic pulling messages. When the OS is informed and thus active, i.e. has been woken-up by an event like an interrupt or incoming packet, it checks those applications with transmit activity requirements and checks if their timers are close to expire.

If, at 216 it is determined that any timers are to go off soon, then at 218 they are processed, and the routine goes to 220. If no timers are to go off soon, then the routine would proceed directly to 220. From here, it proceeds as discussed. The OS notifies those applications to perform the transmission. Then the timer is reset so those applications will not wake up the platform for the next period of quietness. (As when the platform detects an incoming period of quietness, the PMU or PCH may also notify the OS of an expected quietness duration. In this case, the OS may try to pull in the transmit requests that might expire later during the idle period and start the transmission.)

FIG. 3 shows a routine 301 for affecting the primary component in the host, namely, processor, to be in an activity state based on expected idleness as gleaned from a peripheral or network device. The basic idea of this routine is that the communication device (e.g., peripheral device or network interface device) informs the host of the estimated incoming idle duration, and the host then makes an "informed" decision as to which power saving state to enter based on this information, as well as possibly other platform activities.

Initially, at 302, the platform managing entity receives an idle notification from a communication (network interface) device. For example, an idle notice could come from a network agent such as with a network interface card (NIC) such as is taught in U.S. patent application Ser. No. 12/283,931 entitled SYNCHRONIZATION OF MULTIPLE INCOMING NETWORK COMMUNICATION STREAMS, filed on Sep. 17, 2008 and incorporated by reference herein.

At 304, the platform managing entity checks to see if there is any other platform activity that is more frequent than the notified idle duration from the communication device. If not, then at 308, the notified duration [T(n)] is compared with the host break even duration [T(b)]. Ideally, if expected idleness is long enough, the host can be initiated to enter a deeper sleep state (e.g., CPU c5, c6, or C7), whereby cache is flushed and increased power may be saved. Thus, the break-even duration corresponds to the costs (latency, power, etc.) associated with entering such a state. If the notified duration is smaller than this break-even duration, it is likely not worth it to enter such a deeper state.

Accordingly, at 310, if the routine determines that the notified duration is less than the break-even duration, then it goes to 312 and causes the host to stay in its present state or places it in a relatively shallower state of inactivity. On the other hand, if the notified duration is greater than the break-even duration, then the routine goes to 314 and causes the host to go into a deeper state of inactivity, e.g., whereby its cache is flushed and significantly less power is being consumed.

Returning back to 304, if the routine determined that other platform activity may occur that would interrupt or interfere with the notified idleness, then the routine goes to 306 and makes a determination based on the platform activity frequency.

An advantage of this approach is that with existing approaches, CPU scheduling logic causes the CPU to enter deep (e.g., C5, C6) states only when the cache is empty. And it may take several attempts for the CPU to shrink the cache completely. Thus, the CPU often stays in shallow power saving states for unnecessarily long times. With the routine of FIG. 3, however, the host (CPU or processor) can shrink the cache in a single attempt and go into a deep power savings state immediately if the incoming idle duration is longer, for example, than a C5 or C6 break even time. By doing this, the host may achieve significant power savings.

It should be appreciated that various mechanisms can be used to convey the idle notice information from the device(s) to the PMU or host. For example, a PCIe extension could be used. Extensions to the PCIe could be devised so that devices can transfer their resume latency information requirements, e.g., as defined in a platform interface scheme. An additional field carrying the "idle duration" could be added for future versions of the interface. Additionally, extensions could be defined for use in devices including network devices such as wireless NICs to coordinate activity with the PCH. Memory and/or I/O triggers could be used. This is more of an ad-hoc approach, but a memory/IO mapped register could be used to signal this idle information between the communication device and the host. Intelligent host estimations, e.g., based on NIC capability, could also be employed. Network device(s) can set a registry entry informing platform that it will perform traffic regulation (e.g., Smart-FIFO) with the relevant parameters (e.g., buffer size, intended buffering time). The host or PMU could read this information when the device is enabled. If the NIC device changes its behavior, an interrupt could be generated so the PMU or host can update their policy accordingly. With this information from the NIC, the host (or PMU) observes the interrupt pattern from the network devices and estimates the incoming idle duration. With this knowledge, the host is able to take actions described above for optimal power saving.

In the preceding description, numerous specific details have been set forth. However, it is understood that embodiments of the invention may be practiced without these specific details. In other instances, well-known circuits, structures and techniques may have not been shown in detail in order not to obscure an understanding of the description. With this in mind, references to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the preceding description and following claims, the following terms should be construed as follows: The terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chip set components, programmable logic arrays (PLA), memory chips, network chips, and the like.

It should also be appreciated that in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

It should be appreciated that example sizes/models/values/ranges may have been given, although the present invention is not limited to the same. As manufacturing techniques (e.g., photolithography) mature over time, it is expected that devices of smaller size could be manufactured. In addition, well known power/ground connections to IC chips and other components may or may not be shown within the FIGS., for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits) are set forth in order to describe example embodiments of the invention, it should be apparent to one skilled in the art that the invention can be practiced without, or with variation of, these specific details. The description is thus to be regarded as illustrative instead of limiting.

What is claimed is:

1. One or more non-transitory machine-readable storage media having machine executable instructions that, when executed by a host, cause the host to perform operations comprising:
   obtaining, via a network interface of the host, information regarding one or more communication devices external to the host;
   estimating an idle time of the one or more communication devices based on the information; and entering a power saving state for a period of time which is based on the estimated idle time of the one or more communication devices, the power saving state comprising a first state and a second state, which saves more power than the first state, wherein when entering the power saving state, entering the first state if the estimated idle time is less than a break even duration and entering the second state if the estimated idle time is greater than the break even duration.

2. The one or more non-transitory machine-readable storage media of claim 1, wherein the estimating the idle time comprises applying an exponential filter to predict incoming idleness based on past history of idleness duration.

3. The one or more non-transitory machine-readable storage media of claim 1, wherein the information indicates a buffer size of the one or more communication devices.

4. The one or more non-transitory machine-readable storage media of claim 1, wherein the information indicates an intended buffering time of the one or more peripheral network communication devices.

5. The one or more non-transitory machine-readable storage media of claim 1, wherein the operations performed further comprise:

observing an interrupt pattern of the one or more communication devices and estimating the idle time based on the interrupt pattern.

6. The one or more non-transitory machine-readable storage media of claim 1, wherein:

the obtaining the information comprises reading a registry entry when the one or more communication devices are enabled, the one or more communication devices set a traffic regulation parameter in the registry entry, and the traffic regulation parameter indicates at least one of a buffer size or an intended buffering time of the one or more communication devices.

7. The one or more non-transitory machine-readable storage media of claim 6, wherein:

the traffic regulation parameter indicates the one or more communication devices are to perform first-in, first out (FIFO) traffic regulation.

8. The one or more non-transitory machine-readable storage media of claim 1, wherein the operations performed further comprise:

generating an interrupt when the one or more communication devices change their behavior.

9. The one or more non-transitory machine-readable storage media of claim 1, wherein:

the information is obtained from an extension to a peripheral component interconnect standard.

10. The one or more non-transitory machine-readable storage media of claim 1, wherein:

the information is obtained from a field indicating an idle duration, the field is provided according to a peripheral component interconnect standard.

11. The one or more non-transitory machine-readable storage media of claim 1, wherein:

the host comprises a processor in a platform; and
the one or more communication devices are peripheral to the platform.

12. The one or more non-transitory machine-readable storage media of claim 1, wherein:

the information comprises a latency requirement of the one or more communication devices.

13. The one or more non-transitory machine-readable storage media of claim 1, wherein:

the information indicates a capability of the one or more communication devices.

14. The one or more non-transitory machine-readable storage media of claim 1, wherein the second state comprises flushing a cache.

15. A computing device, comprising:

a platform comprising a processor and a power management unit; and one or more network interface cards which are peripherals of the platform, wherein the power management unit, to estimate an idle time of the one or more network interface cards, is configured to observe an interrupt pattern of the one or more network interface cards, the processor is configured to perform a power saving action based on the estimated idle time, the power saving action comprising entering a power saving state for a period of time which is based on the estimated idle time, the power saving state comprising a first state and a second state, which saves more power than the first state, and when performing the power saving action, entering the first state if the estimated idle time is less than a break even duration and entering the second state if the estimated idle time is greater than the break even duration.

16. The computing device of claim 15, wherein:

the power management unit, to estimate the idle time of the one or more network interface cards, is configured to receive information from the one or more network interface cards regarding at least one of a buffer size or an intended buffering time.

17. The computing device of claim 15, further comprising:

a registry, wherein the one or more network interface cards are configured to set an entry in the registry comprising a traffic regulation parameter, and the power management unit, to estimate the idle time of the one or more network interface cards, is configured to read the entry.

18. The computing device of claim 17, wherein:

the power management unit is configured to read the entry when the one or more network interface cards are enabled.

19. The computing device of claim 15, wherein:

the power management unit, to estimate the idle time of the one or more network interface cards, is configured to receive information from the one or more network interface cards regarding a latency requirement.

20. A computing device, comprising:

a processor; and a power management unit, wherein the power management unit is configured to estimate an idle time of one or more peripheral devices by obtaining information from the one or more peripheral devices and estimating the idle time based on the information, and the power management unit is further configured to cause the processor to enter a power saving state for a period of time which is based on the estimated idle time, the power saving state comprising a first state and a second state, which saves more power than the first state, wherein when the processor enters the power saving state, the processor enters the first state if the estimated idle time is less than a break even duration and enters the second state if the estimated idle time is greater than the break even duration, and the information identifies at least one of a buffer size, an intended buffering time, or a latency requirement.

21. The computing device of claim 20, wherein:
the one or more peripheral devices comprise a hard drive.

22. The computing device of claim 20, wherein:
the one or more peripheral devices comprise a network interface card.

\* \* \* \* \*